INVENTOR
KARL HEINZ JAEGER
BY Toulmin & Toulmin
ATTORNEYS

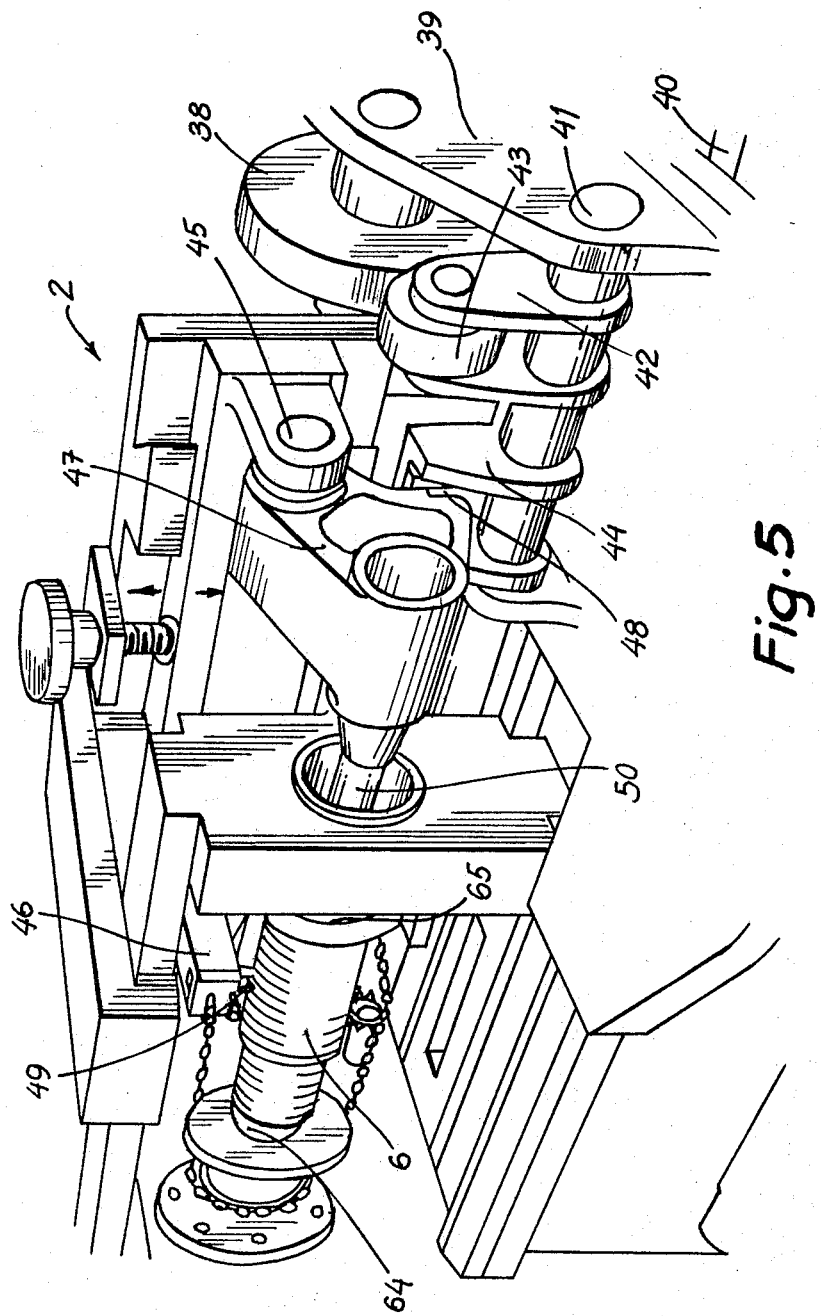

United States Patent Office 3,326,393
Patented June 20, 1967

3,326,393
APPARATUS FOR INTRODUCING AND REMOVING PACKETS OF PISTON RINGS FROM MACHINE TOOLS
Karl Heinz Jaeger, Leichlingen, Germany, assignor to Goetzewerke Friedrich Goetz A.-G., Burscheid, Germany
Filed Mar. 12, 1965, Ser. No. 439,199
Claims priority, application Germany, Apr. 2, 1964, G 40,257
9 Claims. (Cl. 214—1)

This invention relates to a machine tool apparatus for performing operations on a packet of piston rings, particularly, non-circular piston rings.

The object of this invention is an improvement over machine tools for performing operations on non-circular piston rings comprising an apparatus for introducing packets of piston rings into machine tools so that the inner and outer peripheral surfaces of the rings may be operated upon by the machine tools.

Another object of the invention is to provide a continuous and automatic apparatus and method for sorting, turning, cutting, washing and unloading piston rings.

In the machine operations upon so-called non-circular piston rings it is highly important that the rings be axially aligned with one another. This is important because the rings are kept under radial tension during the machining operations and a gap exists which corresponds to a section cut away for spreading.

Devices are already known which permit the clamping of coaxially arranged piston rings in abutment with one another so that they may be put under strain to maintain their circular form.

In a preferred form of this device a packet of combined piston rings is clamped at two diametrically opposite points to press the rings together in the axial direction. For this purpose two parallel plates are used which are provided with adjustable arms projecting from their peripheries to hold the packet of rings. The plates can be moved toward each other by a rotatable spindle which provides quick and sure clamping of the packet. The distance between the base of the device and the axis of the packet of rings corresponds exactly to the distance from a table mounted on the machine to the axis of the packet. Abutments on the device and on the machine ensure proper centering of the rings.

Until now the holding clamp was applied manually to the packet of rings and guided into the machine tool. A purpose of this invention is to perform these movements automatically. In the present invention the conventional machines for working upon the peripheral surface and for the subsequent cutting off the end pieces remain unchanged. The present invention uses mechanically controlled clamping tongs for the packets of piston rings. It is to be noted however that the clamping tongs of this invention are constructed in such a manner that they can be mounted upon the same guideway which will then carry the self-acting tongs which are preferably mounted on transverse guideways for guiding the tongs to and from the work. For the automatic transport of the packets of rings into and out of two working stations, two clamping devices are necessary. In one construction the rings are brought from a magazine and guided into a first working machine. While the packet of rings is being worked upon, the first clamping device is returned to its initial position where it then takes a second packet of rings from the magazine. A second clamping device takes the finished packet of rings from the first working machine to deliver it to the second working machine.

Both the introducing and removing devices are preferably mounted on the same guideway which runs parallel to the lengths of the machines. The clamping devices are moved into position on transverse slideways arranged perpendicular to the main guideway. In their movements the clamping devices can be controlled independently of each other, although it is conceivable that the individual operations can be controlled automatically. Depending on the ring dimensions and lengths of the packages, the durations of the working processes at the various stations can be different. It may be of advantage not only to have the cross-slide movements of the clamping tongs but also their longitudinal movements controlled independently of each other. In that case the transverse slideways would be mounted on separate longitudinal guideways.

Other objects and advantages of the invention will be apparent from the following description taken in connection with the accompanying drawings. It will be understood that changes may be made in the details of construction and arrangements of parts shown and described, as a preferred form has been given by way of illustration only.

Referring to the drawings:

FIGURE 1a is a modified embodiment of FIG. 1 showing separate guideways for the sleds 7 and 8;

Figure 1:
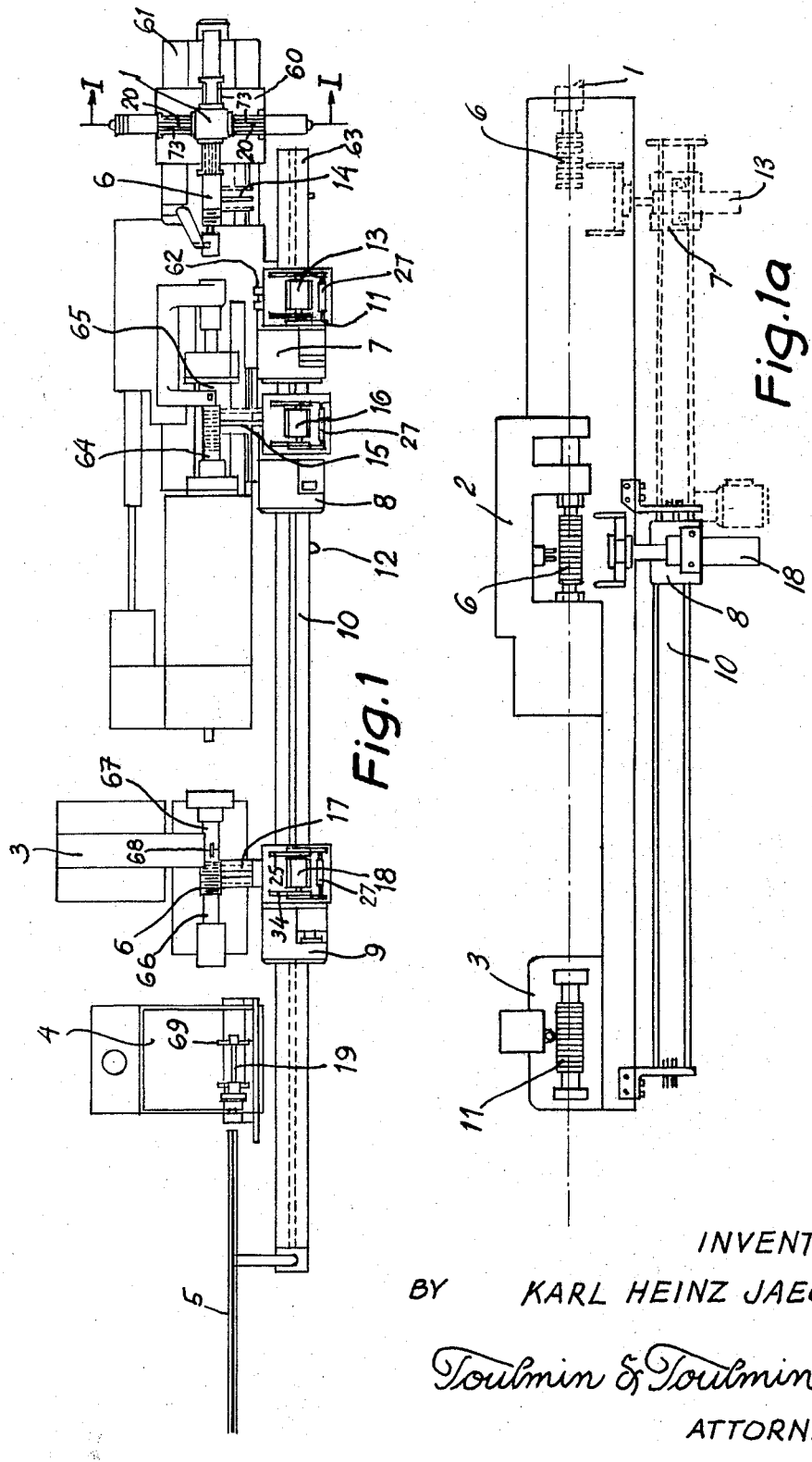
FIGURE 1 is a plan view showing a complete apparatus for sorting, turning, cutting, washing and unloading piston rings.
Figure 3:
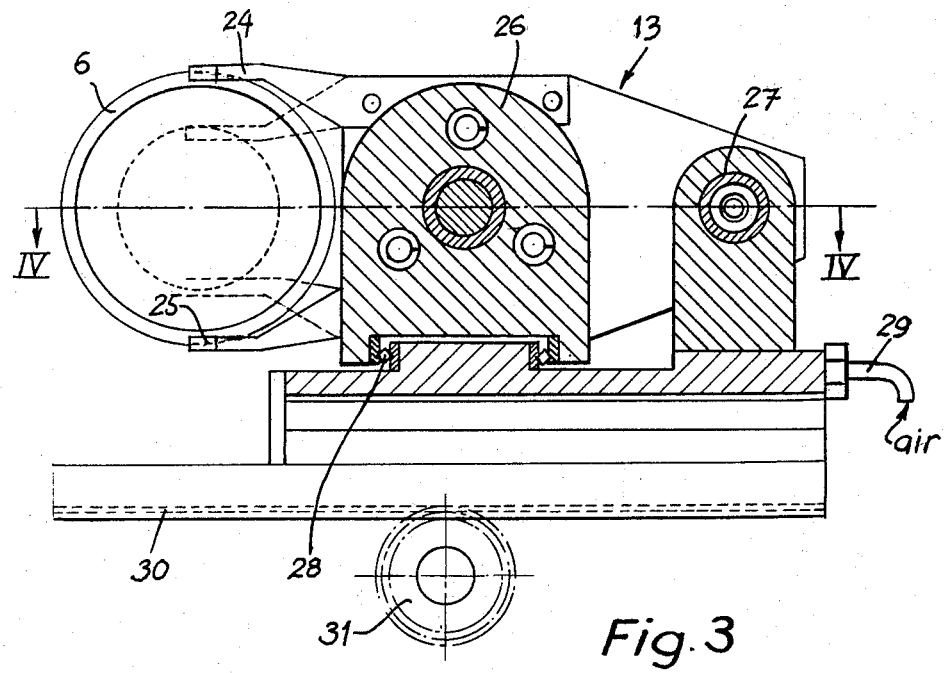
FIGURE 3 is an enlarged vertical cross-section along the lines III—III of the tongs 13 of FIGS. 1, 1a and 4.
Figure 4:
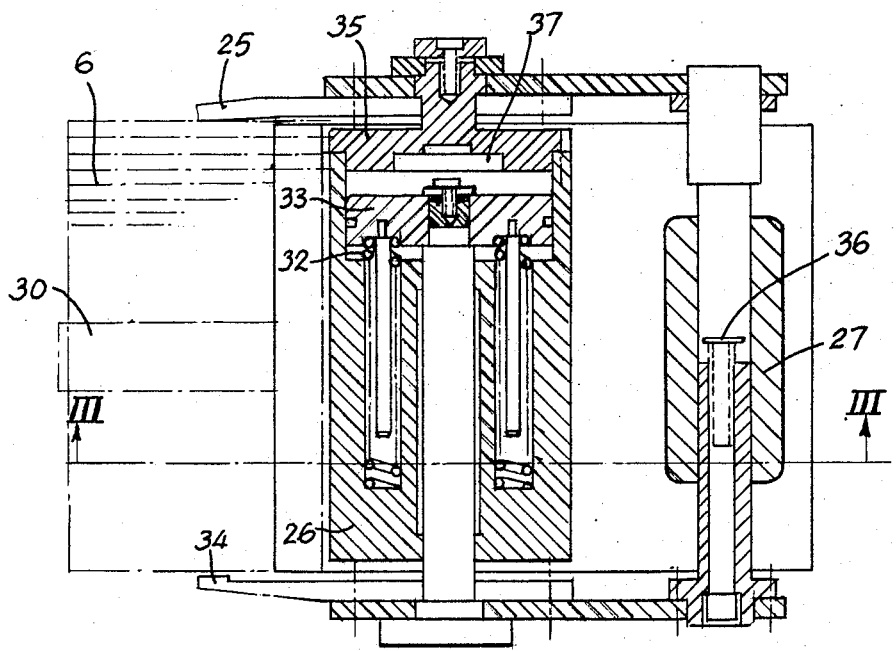

FIGURE 4 is an enlarged horizontal section of the tongs 13 of FIGS. 1 and 1a along the line IV—IV of FIG. 3; and FIGURE 5 is an enlarged perspective view of the copying lathe 2 of FIGS. 1 and 1a.

Referring more particularly to FIG. 1, this figure shows the complete organization consisting of the following working stations which are connected with one another by transport systems:

Loading and sorting mechanism _____ 1
Copying lathe _____ 2
Slitting machine _____ 3
Washing station _____ 4
Unloading station _____ 5

The transport of the workpiece packets 6 is effected by the transport sleds 7, 8 and 9 which are slidably mounted on a guideway 10 extending from the first to the fifth station. The sled 7 moves from stations 1 to 2 and return. The sled 8 moves between stations 2 and 3. Sled 9 moves between stations 3, 4 and 5.

In addition to the five working stations there are also two waiting positions 11 and 12. There are therefore seven positions into which three sleds can move. The sled 7 will be in the waiting position 11 while the waiting position 12 is still free awaiting the approach of sled 8.

The work cycle is commenced by sled 7 which is equipped with gripping tongs 13 and rides across the gearing onto the transverse slideway 14. The transverse slideway 14 actuates the tongs to grip the packet 6, and after the sorting device at 1 has been moved out of the way, the sled 7 moves along guideway 10 over waiting position 11 to working station 2. Here the tongs 13 move upon transverse slideway 15, and transfer the packet of rings 6 to the copying lathe 2. The tongs 13 then return to the starting station 1 while at the same time the copying lathe 2 is put into operation. The gripping tongs 13 then again move forward and raise another packet 6 and move back to waiting position 11. In the meantime the ring packet in the lathe 2 is turned and sled 8 with gripping tongs 16 rides forward upon transverse slideway 15, raises the packet 6, and transports it over guideway 10 and slideway 17 to the machine 3 for cutting the rings open. The tongs 16 are then moved by the sled 3 back into the waiting position 12. The movement of the tongs 16 and return to the waiting position 12 actuates the cutting machine 3. When the cutting machine 3 has finished its work, the sled 9 begins its movement. Sled 9 moves from the unloading station to the position in front of cutting machine 3 to permit the tongs 18 to embrace the finished ring packet 6 and transport it to the washing station 4. The washing tongs 19 take over the packet and rinse it by rotation of the rings through an angle of about 120°. The packet is then returned to the tongs 18, and after washing tongs 19 have swung out of the way, the tongs 18 deposit the packet on the unloading station 5 while said tongs 18 are still in the projected position. The tongs 18 then move back upon the sled 9 while at that time is standing still in a waiting position.

The loading and sorting device 1 has four arms which are pivotally mounted on a common base 60. The base 60 is axially shiftable on a slide 61 of the lathe so as to release the ring packet that is taken from the tongs 13. For this purpose the tongs 13 move up in the dovetail shaped guideway 14 whereby the dovetail shape slide guide 62 will be positioned exactly in front of the guideway 14 so that the tongs 13 can ride upon the guideway 14. The clamping arms 34, 25 grab the ring packet 6 on its front surface so as to press these axially together. Thereafter the sorting mechanism rides outwardly to the right. The tongs 14 then ride back upon the guideway 63 to bring the ring packet 6 to the pattern copying lathe at the level of the guideway 15. The tongs 13 then move on the guideway 15, pushing the packet between the tensioning sleeves 64, 65 so that the ring packet will stand ready for the machining operation by the boring steel 50 and the turning position. After the machining is completed, the boring rod 50 and the external lathe tool 49 move to the right until the ring packet can be removed. The tongs 16 then move upon the guideway 15 and again pick up the ring packet by means of the tensioning arms 34, 25 to bring the packet to the slitting machine 3. The latter has an axially shiftable clamping bushing 66 for pressing the packet against a bushing 67 so that the packet can be cut open by a cutter 68 so that the piece can drop out from the ring packet and slitted rings will remain. These slitted rings are taken up as packets by the tongs 18 from the slitting machine 3 after the clamping bushing 66 has released the packet 6. The tongs 18 then ride to the washing station where the packet 6 is immersed in the washing bath 4 by means of a swinging device 19 whose front side 69 is axially movable to hold the packet during its immersion. The packet will then be taken again by the tongs 18 to hang the packet on the rail 5. From the rail 5 the packet is taken up by hand.

Figure 2:
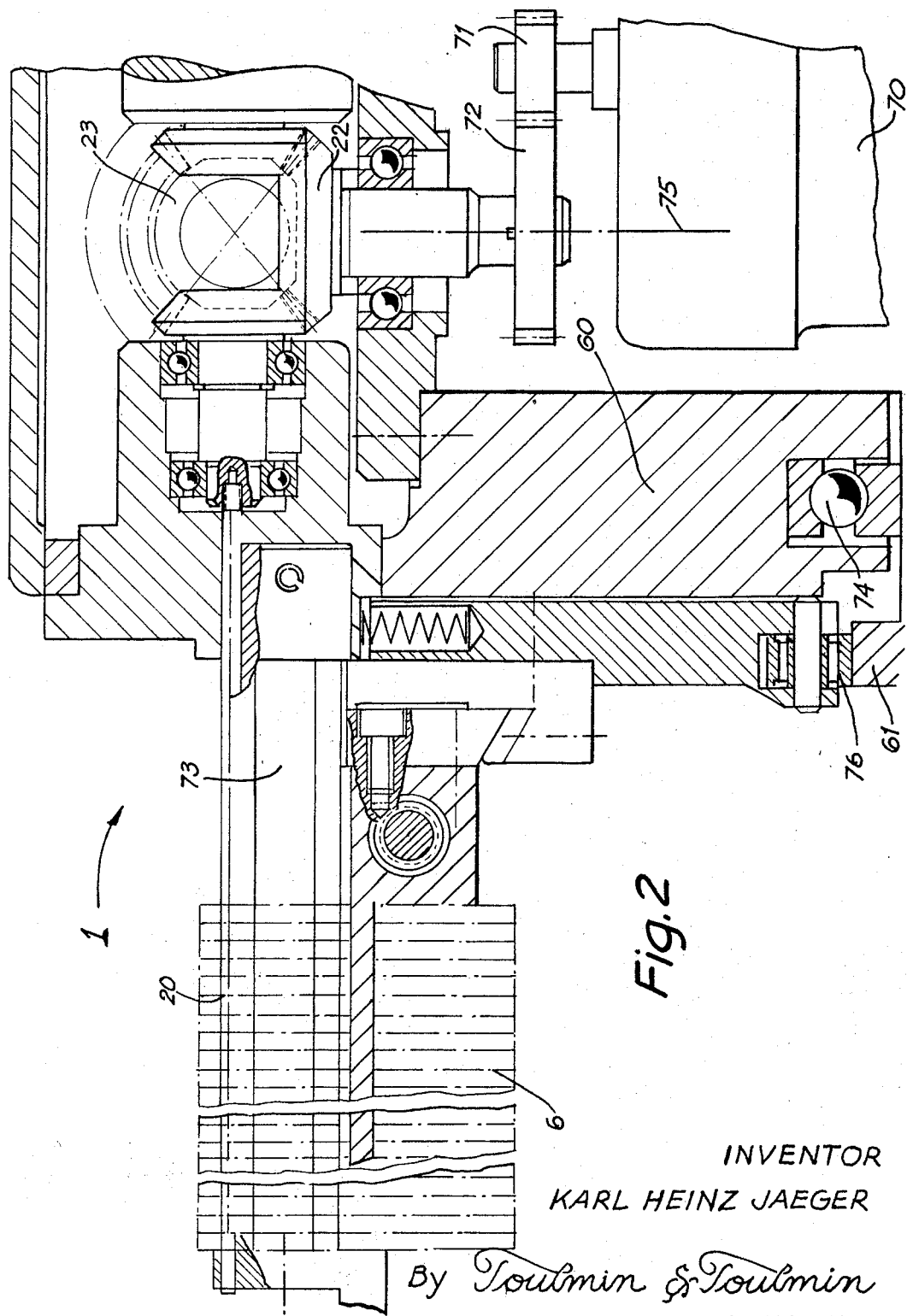
FIGURE 2 is an enlarged vertical cross-section of a portion of the sorting device 1 of FIG. 1, and FIG. 1a showing the piston ring packet mounted on the arm 20.

A portion of the sorting device FIG. 1 is shown in section in FIG. 2, the sorting bars 20 are power-driven by shaft 21 connected to a motor. Motor 70 is shown which drives the two sorting bars 20 by means of the two bevel gears 71, 72. The rotatably mounted sorting bars 20 are positioned above a holding arm 73 which is rigidly connected to the part 60 and with the latter is movable on ball bearings 74 about a vertical axis 75. The combined loading and sorting machine 1 is axially movable on slider 61 through the interposition of a roller bearing 76. The upper end of the shaft attached to the motor carries a bevel gear 22 meshing with four bevel gears 23 on radial shafts at right angles to one another and which are connected indirectly with the sorting bars. The rotating sorting bars 20 ensure that the manually deposited non-circular rings will be rotated until the sorting bar registers with grooves in the inner peripheries of the rings. The forward and backward movement of the sorting mechanism is effected by the action of a driving motor operating a worm gear shaft. A 90° rotation is controlled mechanically by forward and backward movement of the sorting mechanism each time.

FIG. 3 shows a longitudinal section III—III through one of the tongs (13, 16, 18) where the arrangement of the fingers 24, 25, the cylinder housing 26, the guide-frame 27, the guide-rails 28, the conduit 29 for compressed air and the rack and pinion mechanism 30 and 31 are shown. The tongs of this invention are completely disclosed in U.S. Patent No. 2,807,873.

FIG. 4 shows a horizontal section IV—IV through the same tongs. The tensioning of the tongs is effected by coiled springs 32 which urge the piston 33 and the jaw 32 indirectly connected thereto toward the cylinder head 35. By means of the abutment 36 the length of the packet can be regulated. The disengagement of the tongs is effected by compressed air conducted into the space 37 and controlled by an electromagnetic valve.

FIG. 5 shows the copying lathe 2 in perspective. The non-circular pattern disk 38 is journaled in the bearing block 39 fastened to the sled 40. In the block 39 there is another bearing 41 in which the double lever comprising feeler arm 42 with its roller 43 and the control arm 44 are pivotally supported. The control arm 44 is engaged by a contact member 48 which is pivotally mounted in bearing 45 and is fastened to the tool carrier 46 and the transfer arm 47. At the free end of tool carrier 46 the tool 49 which operates upon the workpiece with its cutting edge is fastened. The bearing 45 is vertically adjustable in the direction of the arrow. In this manner the effective radial length of the arm 44 can be adjusted and at the same time the tool 49 and its carrier 46 can be adjusted to a workpiece of any diameter. The copying lathe of this invention is completely disclosed in U.S. Patent No. 2,932,227.

Although the specific embodiments of the invention have been described in considerable detail for the purpose of fully disclosing a practicable operative structure by means of which the invention may be practised, it is to be understood that the particular apparatus herein described is intended to be illustrative only, and the various novel features of the invention may be incorporated in other structural forms without departing from the spirit and scope of the invention as defined in the accompanying claims.

What is claimed is:

1. In a machine tool apparatus for performing operations on a packet of non-circular piston rings, said machine tool apparatus having a plurality of longitudinally spaced work stations, first rail means extending along said work stations in laterally spaced relation thereto, other rails extending laterally from at least some of said work stations to said first rail means, carriage means movable on said other rails for introducing said packet of piston rings in an axial position and in a predetermined circumferentially oriented position into each of said machine tool work stations, said carriage means including means to engage and support a packet of non-circular piston rings, said carriage means being operable for removing said packet of piston rings from each of said machine tool work stations, and means for moving said carriage means along said first rail means from one of said work stations to another.

2. In a machine tool apparatus for performing operations on a packet of non-circular piston rings, said machine tool apparatus having a plurality of longitudinally spaced machine tool work stations, first rail means spaced laterally from said work stations and extending therealong in a direction parallel to the axes of said work stations, second rail means extending laterally from each work station toward said first rail means, carriage means movable on said first and second rail means and introducing said packet of piston rings in an axial position and in a predetermined circumferentially oriented position into each of said machine tool work stations for removing said packet of piston rings in the same said oriented position from each of said machine tool work stations, said carriage means being movable on said first rail means between said work stations and being movable on said second rail means in introducing packets of rings into and removing them from said work stations.

3. In a machine tool apparatus for performing operations on a packet of non-circular piston rings, said machine tool apparatus having a plurality of horizontally spaced machine tool work stations, first rail means in laterally spaced parallel relation to said work stations, a plurality of carriages movable along said first rail means into position of alignment with said work stations, second rail means extending from said first rail means to said work stations, said carriages being movable along said second rail means to and from said work stations, each carriage having means for supporting a packet of piston rings in a predetermined circumferentially oriented position for introduction into a work station and for removal therefrom in the same said position, each carriage being movable between at least two of said work stations for transferring packets of piston rings therebetween.

4. The apparatus according to claim 3, in which said first rail means is a single rail.

5. The apparatus according to claim 3, in which said carriages have independent actuating means.

6. The apparatus according to claim 4, in which said slidable carriages have independent actuating means.

7. The apparatus according to claim 3, in which said first rail means comprises a pair of spaced parallel rails with some of said carriages on each rail.

8. An apparatus according to claim 7, in which the carriage that introduces the packet of rings into a work station is on a different one of said pair of rails from the carriage that removes the packet of rings from the respective work station.

9. The apparatus according to claim 8, in which the said rails of said pair of rails are offset from one another.

References Cited

UNITED STATES PATENTS

| | | | |
|---|---|---|---|
| Re. 24,744 | 12/1959 | Silven et al. | 51—215 X |
| 1,933,225 | 10/1933 | Smith | 214—1 |
| 2,214,361 | 9/1940 | Burroughs | 51—131 |
| 2,754,638 | 7/1956 | Duffens et al. | 51—230 |
| 2,807,873 | 10/1957 | Weissenberger | 29—269 |
| 3,080,840 | 3/1963 | De Man | 214—147 X |
| 3,233,751 | 2/1966 | Bannon | 113—113 X |

GERALD M. FORLENZA, *Primary Examiner.*

MARVIN A. CHAMPION, A. J. MAKAY, *Examiners.*